United States Patent
Chen et al.

(10) Patent No.: US 9,971,126 B2
(45) Date of Patent: May 15, 2018

(54) OPTICAL LENS

(71) Applicant: ABILITY ENTERPRISE CO., LTD., New Taipei (TW)

(72) Inventors: Jung-Yao Chen, New Taipei (TW); Yu-Min Chang, New Taipei (TW); Sih-Han Wu, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 66 days.

(21) Appl. No.: 15/157,397

(22) Filed: May 17, 2016

(65) Prior Publication Data

US 2016/0341935 A1 Nov. 24, 2016

(30) Foreign Application Priority Data

May 20, 2015 (TW) .............................. 104116060 A

(51) Int. Cl.
*G02B 13/18* (2006.01)
*G02B 9/62* (2006.01)
*G02B 13/00* (2006.01)
*G02B 15/177* (2006.01)
*G02B 3/04* (2006.01)
*G02B 13/04* (2006.01)

(52) U.S. Cl.
CPC ........... *G02B 13/0045* (2013.01); *G02B 9/62* (2013.01); *G02B 3/04* (2013.01); *G02B 13/002* (2013.01); *G02B 13/04* (2013.01); *G02B 13/18* (2013.01); *G02B 15/177* (2013.01)

(58) Field of Classification Search
CPC ...... G02B 13/0045; G02B 9/62; G02B 13/18; G02B 3/04; G02B 13/002; G02B 13/04; G02B 15/177
USPC .................................. 359/713, 740, 752, 761
See application file for complete search history.

(56) References Cited

U.S. PATENT DOCUMENTS

| 8,830,591 B2 | 9/2014 | Baba |
| 2009/0303607 A1 | 12/2009 | Inoue et al. |
| 2014/0118844 A1* | 5/2014 | Tsai .......................... G02B 9/62 |
| | | 359/713 |

FOREIGN PATENT DOCUMENTS

| CN | 103370645 A | 10/2013 |
| JP | 2002-196239 A | 7/2002 |
| JP | 2006-031055 A | 2/2006 |
| WO | WO 2012-105181 A1 | 8/2012 |
| WO | WO 2014-192567 A1 | 12/2014 |

* cited by examiner

*Primary Examiner* — Evelyn A Lester
(74) *Attorney, Agent, or Firm* — Rabin & Berdo, P.C.

(57) ABSTRACT

An optical lens is provided. The optical lens having an optical axis comprises, in order from an object side to an image-forming side, a first lens having negative refraction power, a second lens having positive refraction power, a third lens having positive refraction power, a fourth lens having negative refraction power, a fifth lens having positive refraction power, and a sixth lens having refraction power. The sixth lens has an inflection point on a surface toward the image-forming side, the inflection point is separated from an optical axis by a distance h13, the radius of the sixth lens is H3, and $|h13/H13| \leq 0.55$.

20 Claims, 4 Drawing Sheets

OPTICAL LENS

This application claims the benefit of Taiwan application Serial No. 104116060, filed May 20, 2015, and the subject matter of which is incorporated herein by reference.

BACKGROUND

Technical Field

The present invention relates to an optical lens, especially to an optical lens with smaller volume and better image quality.

Description of the Related Art

In recent years, requirements for real-time photographs and dynamic photographs are increased, and along with the continuous progress of technology of smart phones and tablet computers, various mobile devices require improved optical image qualities. In addition, due to the thinning design of various mobile devices, people's needs for optical systems continuously increase as well. With the pursuit of miniaturization, the requirements for image qualities have gradually increased as well.

A conventional optical image-capturing system installed in portable electronic products is usually formed of several lenses. However, due to the popularity of high level mobile devices, such as smart phones, users have quickly upgraded their requirements for the pixels and imaging qualities of optical image-capturing systems. In addition, sizes of photosensitive components have increased as well; accordingly, conventional optical systems have failed to satisfy the current trends.

Therefore, it is in need to provide novel optical lenses having reduced sizes and improved image qualities with reduced costs.

SUMMARY OF THE INVENTION

The present invention is related to an optical lens, which achieves both of the miniaturization of the optical lens and the improvement of image quality.

According to an embodiment of the present invention, an optical lens is provided. The optical lens has an optical axis and includes, in order from an object side to an image-forming side: a first lens having negative refractive power, a second lens having positive refractive power, a third lens having positive refractive power, a fourth lens having negative refractive power, a fifth lens having positive refractive power, and a sixth lens having refractive power. An image-side surface of the sixth lens has an infection point, a distance between the infection point and the optical axis is h13, a radius of the sixth lens is H13, and $|h13/H13| \le 0.55$.

According to another embodiment of the present invention, an optical lens is provided. The optical lens has an optical axis and includes, in order from an object side to an image-forming side: a first lens having negative refractive power, a second lens having positive refractive power, a third lens having positive refractive power, a fourth lens having negative refractive power, a fifth lens having positive refractive power, and a sixth lens having refractive power. An image-side surface of the sixth lens has an infection point, an extending distance between an intersection point of the image-side surface of the sixth lens and the optical axis and a projected position of the infection point on the optical axis is δ13, a distance between the image-side surface of the sixth lens and an imaging plane along the optical axis is BF, and $|\delta 13/BF| \le 1.0$.

According to another embodiment of the present invention, an optical lens is provided. The optical lens, in order from an object side to an image-forming side includes: a first lens having negative refractive power, a second lens having positive refractive power, a third lens having positive refractive power, a fourth lens having negative refractive power, a fifth lens having positive refractive power, and a sixth lens having refractive power. A central thickness of the sixth lens is T6, and $T6 \le 0.55$ mm.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
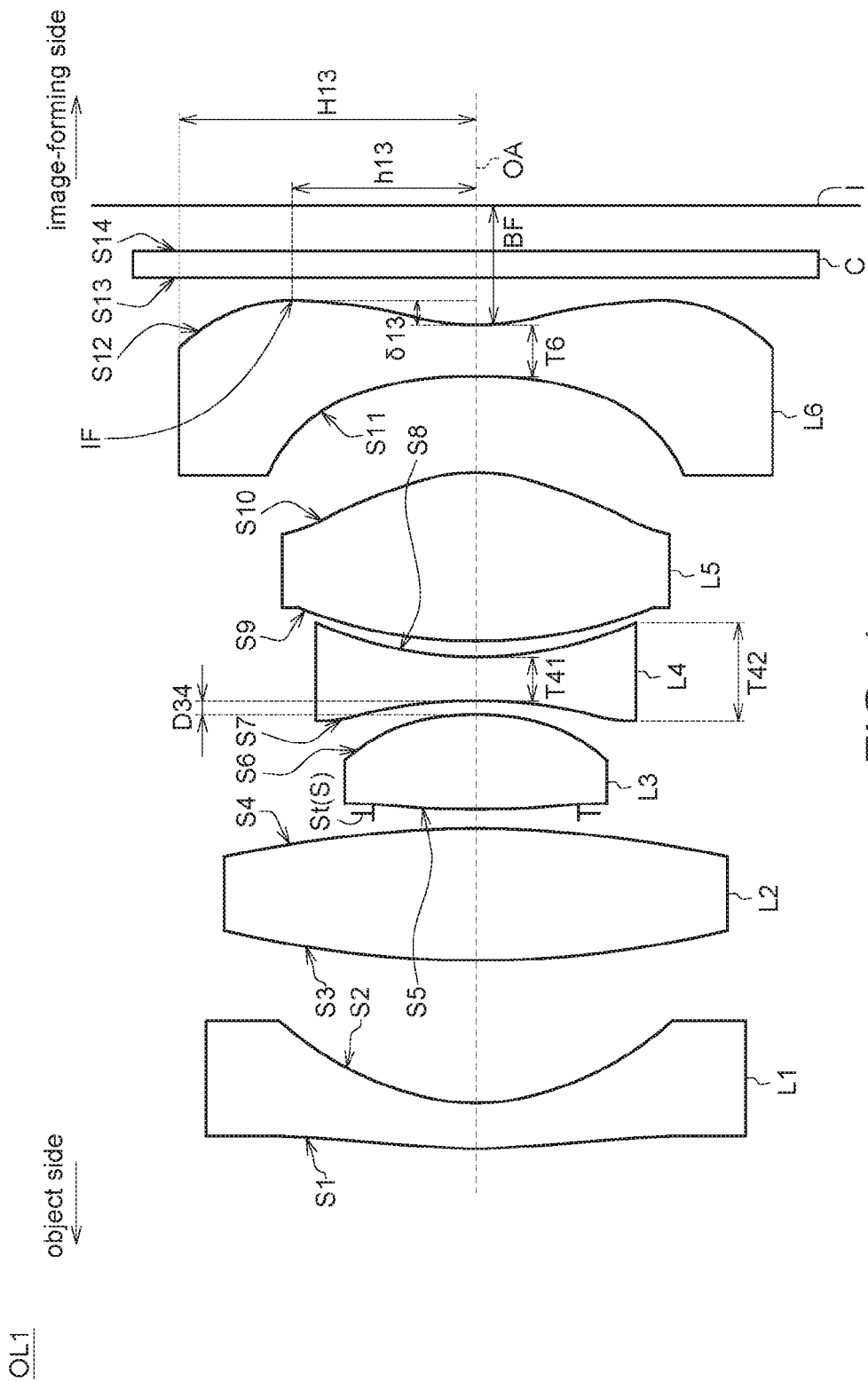
FIG. 1 shows an optical lens according an embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

FIG. 1 shows an optical lens OL1 according an embodiment of the present invention. To highlight the features of the present embodiment, the drawings merely show components related to the present embodiment, and the irrelevant or minor components are omitted. The optical lens OL1 of the present embodiment may be a wide-angle lens and may be employed in a device capable of projecting or capturing images. For example, the device may be but not limited to a hand-held communication system, a car imaging lens, a monitoring system, a digital camera, a digital camcorder or a projector.

As shown in FIG. 1, the optical lens OL1 includes, in order from an object side to an image-forming side, at least a first lens L1, a second lens L2, a third lens L3, a fourth lens L4, a fifth lens L5, and a sixth lens L6. The first lens L1, the second lens L2, the third lens L3, the fourth lens L4, the fifth lens L5, and the sixth lens L6 are arranged on an optical axis OA.

In an embodiment, the first lens L1 may have refractive power, such as negative refractive power; the second lens L2 may have refractive power, such as positive refractive power; the third lens L3 may have refractive power, such as positive refractive power; the fourth lens L4 may have refractive power, such as negative refractive power; the fifth lens L5 may have refractive power, such as positive refractive power; the sixth lens L6 may have refractive power, such as negative refractive power or positive refractive power.

In an embodiment, the optical lens OL1 may satisfy the condition: $50 \leq V1$, wherein V1 is an Abbe number of the first lens L1. Furthermore, in another embodiment, the optical lens OL1 may further satisfy the condition: $50 \leq V1 \leq 70$.

In an embodiment, the optical lens OL1 may satisfy the condition: $V2 \leq 45$, wherein V2 is an Abbe number of the second lens L2.

In an embodiment, the optical lens OL1 may satisfy the conditions: $40 \leq |F12+F34-D34|$ and/or $|F12+F34-D34| \leq 55$, wherein F12 is a total focal length of the first lens L1 and the second lens L2, F34 is a total focal length of the third lens L3 and the fourth lens L4, and D34 is a distance between an image-side surface S6 of the third lens L3 and an object-side surface S7 of the fourth lens L4.

In an embodiment, the optical lens OL1 may satisfy the condition: $0.9 \leq |F3/F4|$, wherein F3 is a focal length of the third lens L3, and F4 is a focal length of the fourth lens L4. Furthermore, in another embodiment, the optical lens OL1 may further satisfy the conditions: $0.95 \leq |F3/F4|$ and/or $|F3/F4| \leq 1.2$.

In an embodiment, the optical lens OL1 may satisfy the condition: $C4 \leq 3.0$, wherein $T42/T41=C4$, T41 is a central thickness of the fourth lens L4 or a length of the fourth lens L4 along the optical axis OA direction, and T42 is an edge thickness of the fourth lens L4. Furthermore, in another embodiment, the optical lens OL1 may further satisfy the condition: $1.5 \leq C4 \leq 3.0$.

In an embodiment, the sixth lens L6 of the optical lens OL1 may satisfy: $T6 \leq 0.55$ millimeter (mm), wherein T6 is a central thickness of the sixth lens L6 or a thickness of the sixth lens L6 on the optical axis OA. Furthermore, in another embodiment, the sixth lens L6 may further satisfy: $0.35 \text{ mm} \leq T6 \leq 0.55 \text{ mm}$.

In an embodiment, the first lens L1, the second lens L2, the third lens L3, the fourth lens L4, the fifth lens L5, and the sixth lens L6 may respectively be a spherical lens, an aspheric lens, and/or a free-form lens, but the invention is not limited thereto.

Specifically speaking, each of the free-form lenses has at least one free-form surface; that is, the object-side surface and/or the image-side surface of a free-form lens is a free-form surface. Each of the aspheric lenses has at least one aspheric surface; that is, the object-side surface and/or the image-side surface of an aspheric lens is an aspheric surface. Each of the aspheric surfaces may satisfy the following equation:

$$Z = \left[ \frac{(C*Y^2)}{1+\sqrt{1-(K+1)C^2Y^2}} \right] + \sum (A_i * Y^i)$$

where Z is the coordinate in the optical axis OA direction, and the direction of the light propagation is designated as positive; A4, A6, A8, A10, A12, A14, and A16 are aspheric coefficients; K is coefficient of quadratic surface; C is reciprocal of R ($C=1/R$); R is the radius of curvature; Y is the coordinate in a direction perpendicular to the optical axis OA, in which the upward direction away from the optical axis OA is designated as positive. In addition, each of the parameters or the coefficients of the equation of each of the aspheric lenses may be designated respectively to determine the focal length of each of the aspheric lenses.

In another embodiment, the second lens L2 may be a spherical lens, and at least one of the first lens L1, the third lens L3, the fourth lens L4, the fifth lens L5, and the sixth lens L6 may be an aspheric lens or a free-form lens.

In a further embodiment, the second lens L2 is a spherical lens, and the first lens L1, the third lens L3, the fourth lens L4, the fifth lens L5, and the sixth lens L6 are all aspheric lenses. For example, the second lens L2 may be a spherical lens with both of the object-side surface and the image-side surface thereof being spherical surfaces, and the first lens L1, the third lens L3, the fourth lens L4, the fifth lens L5, and the sixth lens L6 are all aspheric lenses with the object-side surfaces and the image-side surfaces thereof being all aspheric surfaces.

Furthermore, in an embodiment, the sixth lens L6 of the optical lens OL1 is an aspheric lens, the image-side surface S12 of the sixth lens L6 is an aspheric surface, and the image-side surface S12 of the sixth lens L6 has an infection point IF. A distance between the infection point IF of the sixth lens L6 and the optical axis OA is h13, a radius of the sixth lens L6 is H13, and the optical lens OL1 may satisfy the condition: $|h13/H13| \leq 0.55$. Furthermore, in another embodiment, the optical lens OL1 may further satisfy the condition: $0.3 \leq |h13/H13| \leq 0.55$.

In another embodiment, h13 may be a minimum distance or a vertical distance between the infection point IF of the sixth lens L6 and the optical axis OA, and radius H6 may be a minimum distance or a vertical distance between an outer edge of the sixth lens L6 and the optical axis OA.

In a further embodiment, an extending distance between an intersection point of the image-side surface S12 of the sixth lens L6 and the optical axis OA and a projected position of the infection point on the optical axis OA is δ13, and a distance between the image-side surface S12 of the sixth lens L6 and an imaging plane I is BF. In other words, the projection position is a position of the optical axis OA on which the infection point is projected. The optical lens OL1 may satisfy the condition: $|δ13/BF| \leq 1.0$. Furthermore, in another embodiment, the optical lens OL1 may also satisfy the conditions: $0.4 \leq |δ13/BF|$ and/or $|δ13/BF| \leq 0.7$.

Besides, in an embodiment, the first lens L1, the second lens L2, the third lens L3, the fourth lens L4, the fifth lens L5, and the sixth lens L6 may respectively be a glass lens formed of a glass material or a plastic lens formed of a plastic material.

For example, the second lens L2 may be a glass lens, and at least one of the first lens L1, the third lens L3, the fourth lens L4, the fifth lens L5, and the sixth lens L6 is a plastic lens. Alternatively, the first lens L1, the second lens L2, the third lens L3, the fourth lens L4, the fifth lens L5, and the sixth lens L6 may all be plastic lenses, but the invention is not limited thereto. The material of the plastic lenses may include, but not limited to, polycarbonate, cyclic olefin copolymer (e.g. APEL), polyester resins (e.g. OKP4 or OKP4HT), or a mixture material including at least one of the above-mentioned three materials.

In addition, please refer to FIG. 1. The object-side surface S1 of the first lens L1 may be a convex surface toward the object side having positive refractive power, and the image-side surface S2 may be a concave surface concave toward the object side having positive refractive power. Furthermore, the first lens L1 may be a lens having negative refractive power, including but not limited to a convex-concave lens having negative refractive power, and the object-side surface S1 and the image-side surface S2 may both be aspheric surfaces.

The object-side surface S3 of the second lens L2 may be a convex surface toward the object side having positive refractive power, and the image-side surface S4 may be a convex surface toward the image side having negative refractive power. Furthermore, the second lens L2 may be a lens having positive refractive power, including but not limited to a double convex lens having positive refractive power, and the object-side surface S3 and the image-side surface S4 may both be spherical surfaces.

The object-side surface S5 of the third lens L3 may be a convex surface toward the object side having positive refractive power, and the image-side surface S6 may be a convex surface toward the image side having negative refractive power. Furthermore, the third lens L3 may be a lens having positive refractive power, including but not limited to a double convex lens having positive refractive power, and the object-side surface S5 and the image-side surface S6 may both be aspheric surfaces.

The object-side surface S7 of the fourth lens L4 may be a concave surface concave toward the image side having negative refractive power, and the image-side surface S8 may be a convex surface toward the object side having positive refractive power. Furthermore, the fourth lens L4 may be a lens having negative refractive power, including but not limited to a double concave lens having negative refractive power, and the object-side surface S7 and the image-side surface S8 may both be aspheric surfaces.

The object-side surface S9 of the fifth lens L5 may be a convex surface toward the object side having positive refractive power, and the image-side surface S10 may be a convex surface toward the image side having negative refractive power. Furthermore, the fifth lens L5 may be a lens having positive refractive power, including but not limited to a double convex lens having positive refractive power, and the object-side surface S9 and the image-side surface S10 may both be aspheric surfaces.

The object-side surface S11 of the sixth lens L6 may be a concave surface concave toward the image side having negative refractive power, and the image-side surface S12 forms a substantially convex surface protruded toward the image side and forms a concave surface concave toward the object side at a location close to the optical axis OA. The image-side surface S12 has positive refractive power at the optical axis OA. Furthermore, the sixth lens L6 may be a double concave lens having central regions of both surfaces being concave, and the object-side surface S11 and the image-side surface S12 may both be aspheric surfaces.

Moreover, as shown in FIG. 1, the optical lens OL1 may further include a stop St and a protection plate C. In addition, an image capturing unit (not shown in drawings) may be disposed on the imaging plane I for photo-electrically converting light beams passing through the optical lens OL1. The stop St may be arranged between any two of the lenses L1-L6 of the optical lens OL1, at the object side of the first lens L1, or between the sixth lens L6 and the imaging plane I. For example, the stop St may be disposed between the second lens L2 and the third lens L3, but not limited thereto.

In addition, the protection plate C may be disposed between the sixth lens L6 and the imaging plane I.

Additionally, a filter film (not shown in the drawings) may be formed on the protection plate C for filtering an infrared light. Or, the optical lens OL1 may further include a filter (not shown in drawings), and the filter can be disposed between the sixth lens L6 and the protection plate C. Besides, in another embodiment, the functions of protecting the image capturing unit and filtering the infrared light can be both integrated into the protection plate C.

Table 1 lists the implementation of the optical lens OL1, including the curvature radius, the thickness, the refractive index, and the Abbe number (chromatic dispersion coefficient) of each of the lenses. The surface numbers of the lenses are sequentially ordered from the object side to the image-forming side. For example, "S" stands for the stop, "S1" stands for the object-side surface S1 of the first lens L1, "S2" stands for the image-side surface S2 of the first lens L1, and "S13" and "S14" respectively stand for the object-side surface S13 and the image-side surface S14 of the protection plate C. In addition, the "thickness" stands for the distance between an indicated surface and an adjacent surface close to the image-forming side. For example, the thickness of the object-side surface S1 is the distance between the object-side surface S1 of the first lens L1 and the image-side surface S2 of the first lens L1, and the thickness of the image-side surface S2 is the distance between the image-side surface S2 of the first lens L1 and the object-side surface S3 of the second lens L2.

TABLE 1

| Lens | Surface number | Curvature radius (mm) | Thickness (mm) | Refractive index | Abbe number |
|---|---|---|---|---|---|
| L1 | S1 | 5.996 | 0.366 | 1.540 | 56.0 |
|  | S2 | 1.986 | 1.097 |  |  |
| L2 | S3 | 9.44 | 1.0 | 1.80 | 40.0 |
|  | S4 | −9.44 | 0.137 |  |  |
| St | S | ∞ | 3.84E−03 |  |  |
| L3 | S5 | 4.265 | 0.798 | 1.530 | 57.0 |
|  | S6 | −2.095 | 0.12 |  |  |
| L4 | S7 | −6.45 | 0.35 | 1.640 | 25.0 |
|  | S8 | 2.34 | 0.12 |  |  |
| L5 | S9 | 4.784 | 1.258 | 1.540 | 58.0 |
|  | S10 | −1.674 | 0.74 |  |  |
| L6 | S11 | −6.5 | 0.55 | 1.530 | 60.0 |
|  | S12 | 1.84 | 0.384 |  |  |
| C | S13 | ∞ | 0.21 | 1.50 | 60 |
|  | S14 | ∞ | 0.37 |  |  |
|  | I |  |  |  |  |

Moreover, if the object-side surfaces S1, S5, S7, S9, and S11 and the image-side surfaces S2, S6, S8, S10, and S12 of the first lens L1, the third lens L3, the fourth lens L4, the fifth lens L5, and the sixth lens L6 of the optical lens OL1 are aspheric surfaces, the aspheric coefficients of the above-mentioned surfaces may be listed as indicated in table 2.

TABLE 2

|  | S1 | S2 | S5 | S6 | S7 |
|---|---|---|---|---|---|
| K | −1.60E+01 | −6.46E−01 | −5.95E+00 | 1.39E+00 | −3.22E+00 |
| A4 | −106E−02 | −2.60E−03 | 7.76E−03 | 4.25E−02 | −4.97E−02 |
| A6 | −6.28E−04 | −9.42E−04 | −9.12E−02 | −9.47E−02 | −1.84E−02 |
| A8 | 2.64E−04 | −5.61E−04 | 6.69E−02 | 3.68E−02 | 3.22E−02 |
| A10 | 1.91E−05 | 4.26E−04 | 9.04E−02 | 4.68E−02 | 7.92E−03 |
| A12 | −9.03E−06 | −2.35E−04 | −3.53E−01 | −8.38E−02 | −2.13E−02 |
| A14 | 6.21E−07 | 6.98E−05 | 2.15E−01 | 3.25E−02 | 9.55E−03 |
| A16 | 0.00E+00 | 0.00E+00 | 0.00E+00 | 0.00E+00 | 0.00E+00 |

|  | S8 | S9 | S10 | S11 | S12 |
|---|---|---|---|---|---|
| K | −7.57E+00 | 8.68E+00 | −5.09+00 | 5.77E−01 | −6.79E−01 |
| A4 | −9.05E−03 | .40E−03 | −5.75E−02 | −7.04E−02 | −1.70E−01 |
| A6 | 1.54E−02 | −5.02E−03 | 2.94E−02 | −8.01E−02 | 6.51E−02 |
| A8 | −4.68E−03 | 7.71E−04 | −6.93E−04 | 1.51E−01 | −1.84E−02 |
| A10 | 1.58E−03 | −1.85E−03 | −2.88E−03 | −1.18E−01 | 2.99E−03 |
| A12 | 2.09E−04 | 5.68E−04 | 3.28E−04 | 4.97E−02 | −2.50E−04 |
| A14 | −2.79E−04 | 6.41E−04 | 2.48E−04 | −1.14E−02 | 3.61E−06 |
| A16 | 0.00E+00 | −3.21E−04 | −2.72E−05 | 1.09E−03 | 6.33E−07 |

Figure 2B:
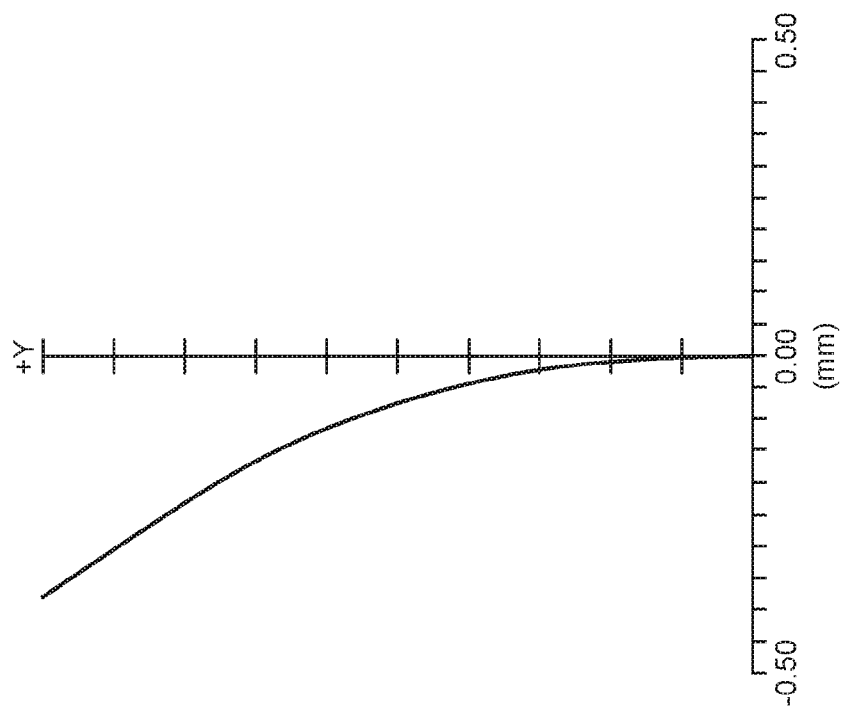
FIG. 2B shows a field curvature chart of an optical lens according to an embodiment of the present invention.
Figure 2A:
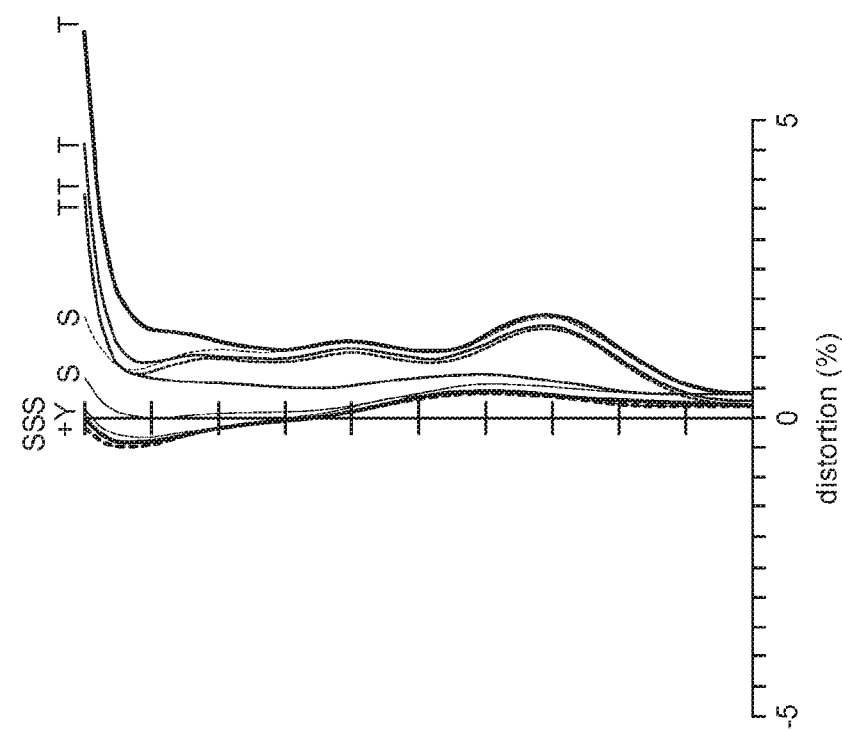
FIG. 2A shows a distortion chart of an optical lens according to an embodiment of the present invention.

FIG. 2A shows the distortion chart of the optical lens OL1 according to an embodiment of the present invention. As shown in the drawing, the distortion values of light beams are all set within favorable ranges.

FIG. 2B shows the field curvature chart of the optical lens OL1 according to an embodiment of the present invention. The curves T and S stand for the chromatic aberration of the optical lens OL1 to the tangential rays and the sagittal rays. As shown in the drawing, the tangential values and the sagittal values of light beams are all controlled within favorable ranges.

Figure 3:
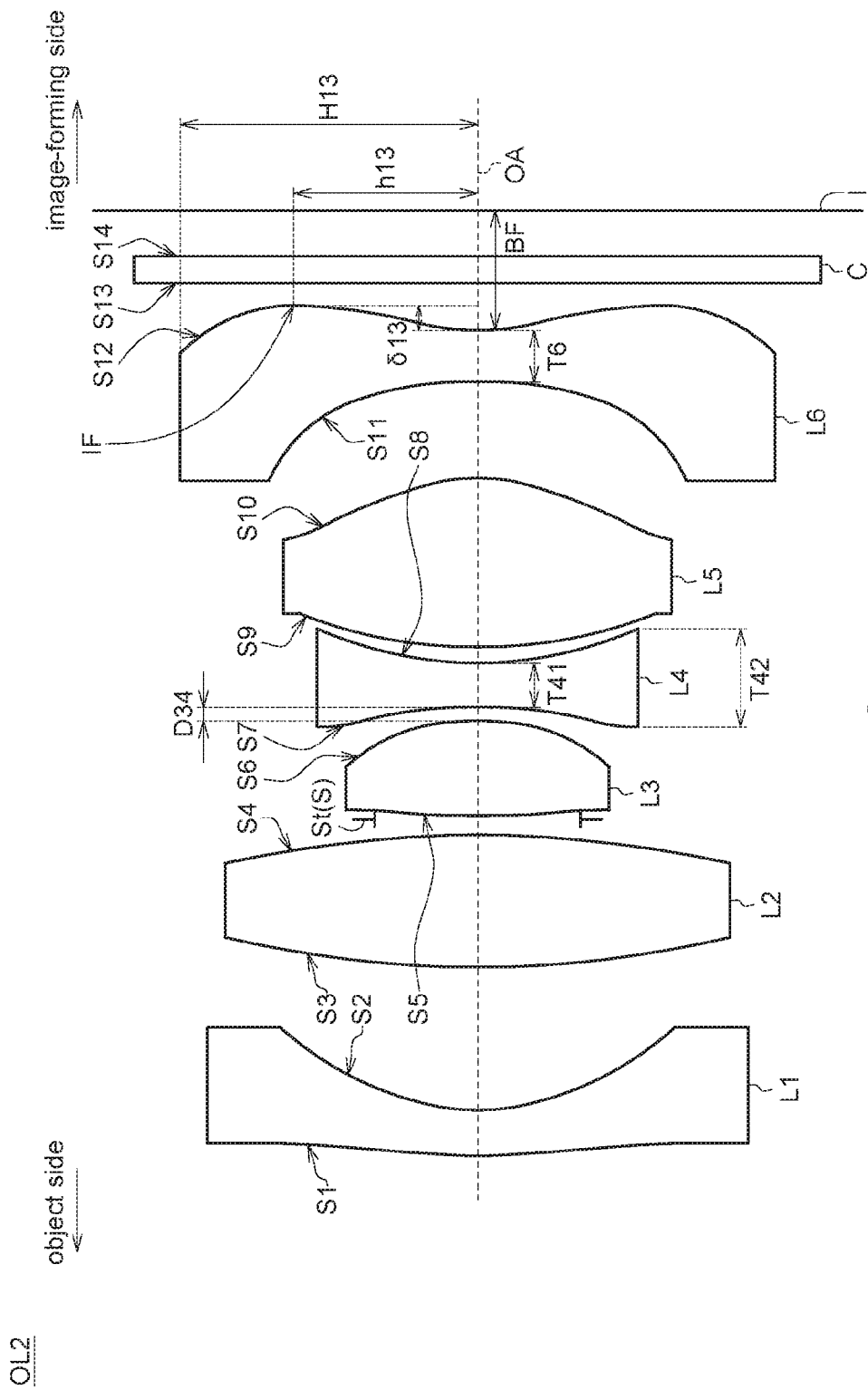
FIG. 3 shows an optical lens according another embodiment of the present invention.

FIG. 3 shows an optical lens OL2 according another embodiment of the present invention. The structure of the optical lens OL2 is basically the same as that of the optical lens OL1, and the main differences are the curvature radius, thickness, the refractive index, and the Abbe number of each of the lenses.

Table 3 lists the implementation of the optical lens OL2, including the curvature radius, the thickness, the refractive index, and the Abbe number (chromatic dispersion coefficient) of each of the lenses.

TABLE 3

| Lens | Surface number | Curvature radius (mm) | Thickness (mm) | Refractive index | Abbe number |
|---|---|---|---|---|---|
| L1 | S1 | 6.19 | 0.37 | 1.540 | 57.0 |
|  | S2 | 1.97 | 1.13 |  |  |
| L2 | S3 | 9.02 | 1.04 | 1.80 | 40.0 |
|  | S4 | −9.02 | 0.13 |  |  |
| St | S | ∞ | 0.016 |  |  |
| L3 | S5 | 4.22 | 0.75 | 1.540 | 56.0 |
|  | S6 | −2.13 | 0.118 |  |  |
| L4 | S7 | −6.18 | 0.35 | 1.630 | 25.0 |
|  | S8 | 2.34 | 0.13 |  |  |
| L5 | S9 | 4.70 | 1.33 | 1.530 | 57.0 |
|  | S10 | −1.64 | 0.77 |  |  |
| L6 | S11 | −6.92 | 0.42 | 1.530 | 60.0 |
|  | S12 | 1.83 | 0.372 |  |  |
| C | S13 | ∞ | 0.21 | 1.50 | 60 |
|  | S14 | ∞ | 0.37 |  |  |
| I |  |  |  |  |  |

Moreover, if the object-side surfaces S1, S5, S7, S9, and S11 and the image-side surfaces S2, S6, S8, S10, and S12 of the first lens L1, the third lens L3, the fourth lens L4, the fifth lens L5, and the sixth lens L6 of the optical lens OL2 are aspheric surfaces, the aspheric coefficients of the above-mentioned surfaces may be listed as indicated in table 4.

TABLE 4

|  | S1 | S2 | S5 | S6 | S7 |
|---|---|---|---|---|---|
| K | −1.36E+01 | −5.99E−01 | −4.59E+00 | 1.37E+00 | −4.73E+00 |
| A4 | −1.04E−02 | −1.45E−03 | −8.07E−03 | 4.35E−02 | −4.86E−02 |
| A6 | −6.28E−04 | −8.30E−04 | −9.27E−02 | −9.85E−02 | −1.81E−02 |
| A8 | 2.66E−04 | −4.23E−04 | 7.23E−02 | 3.92E−02 | 3.15E−02 |
| A10 | 1.88E−05 | 4.51E−04 | 8.36E−02 | 4.59E−02 | 7.41E−03 |
| A12 | −9.05E−06 | −2.47E−04 | −3.49E−01 | −9.01E−02 | −2.24E−02 |
| A14 | 5.97E−07 | 7.89E−05 | 2.10E−01 | 3.57E−02 | 1.07E−02 |
| A16 | 0.00E+00 | 0.00E+00 | 0.00E+00 | 0.00E+00 | 0.00E+00 |

|  | S8 | S9 | S10 | S11 | S12 |
|---|---|---|---|---|---|
| K | −7.53E+00 | 8.53E+00 | −5.05E+00 | 2.10E+00 | −6.66E−01 |
| A4 | −8.34E−03 | 2.56E−03 | −5.56E−02 | −7.11 E−02 | −1.72E−01 |
| A6 | 1.53E−02 | −5.07E−03 | 2.92E−02 | −8.23E−02 | 6.52E−02 |

TABLE 4-continued

| | | | | | |
|---|---|---|---|---|---|
| A8 | −4.83E−03 | 6.57E−04 | −8.07E−04 | 1.51E−01 | −1.84E−02 |
| A10 | 1.45E−03 | −1.89E−03 | −2.92E−03 | −1.18E−01 | 2.98E−03 |
| A12 | 2.55E−04 | 6.06E−04 | 3.19E−04 | 4.97E−02 | −2.50E−04 |
| A14 | −2.84E−04 | 6.67E−04 | 2.60E−04 | −1.14E−02 | 3.54E−06 |
| A16 | 0.00E+00 | −3.36E−04 | −2.75E−05 | 1.09E−03 | 6.82E−07 |

Figure 4B:
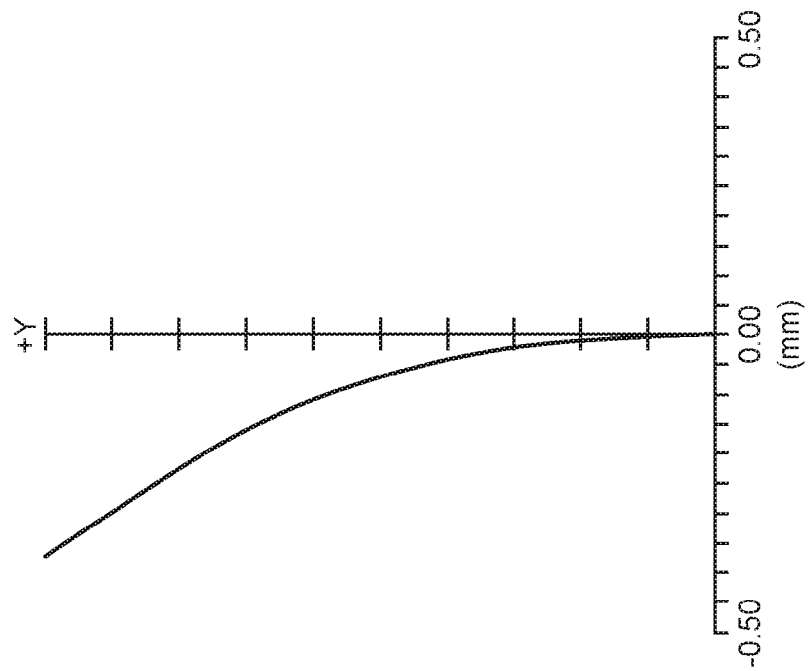
FIG. 4B shows a field curvature chart of an optical lens according to another embodiment of the present invention.
Figure 4A:
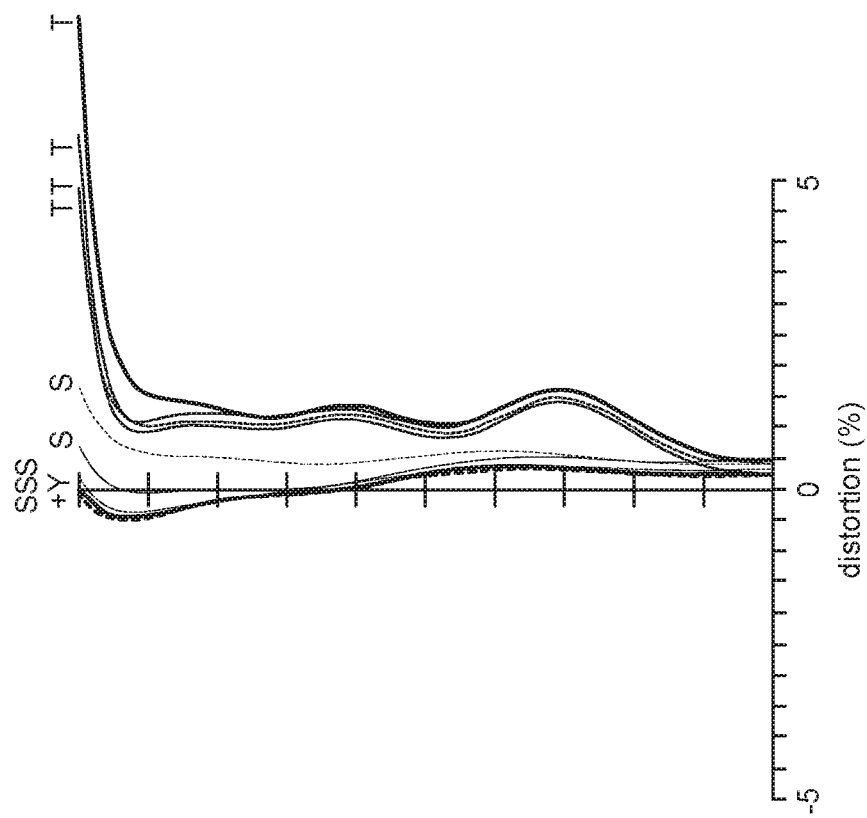
FIG. 4A shows a distortion chart of an optical lens according to another embodiment of the present invention.

FIG. 4A shows the distortion chart of the optical lens OL2 according to an embodiment of the present invention. As shown in the drawing, the distortion values of light beams are all set within favorable ranges.

FIG. 4B shows the field curvature chart of the optical lens OL2 according to an embodiment of the present invention. The curves T and S stand for the chromatic aberration of the optical lens OL2 to the tangential rays and the sagittal rays. As shown in the drawing, the tangential values and the sagittal values of light beams are all controlled within favorable ranges.

Moreover, table 5 lists the optical information of the optical lens OL1 and the optical lens OL2.

TABLE 5

| | Optical lens OL1 | Optical lens OL2 |
|---|---|---|
| V1 | 56 | 57 |
| V2 | 40 | 40 |
| F12 | 26.9 | 22.7 |
| F34 | 20.6 | 23.7 |
| D34 | 0.115 | 0.118 |
| \| F12 + F34 − D34 \| | 47.4 | 46.3 |
| h13 | 1.35 | 1.28 |
| H13 | 2.93 | 2.93 |
| \| h13/H13 \| | 0.46 | 0.44 |
| δ13 | 0.19 | 0.21 |
| BF | 0.378 | 0.372 |
| \| δ13/BF \| | 0.5 | 0.56 |
| F3 | 2.74 | 2.75 |
| F4 | −2.64 | −2.6 |
| \| F3/F4 \| | 1.04 | 1.06 |
| T6 | 0.473 | 0.417 |
| C4 | 2.325 | 2.22 |

While the invention has been described by way of example and in terms of the preferred embodiment(s), it is to be understood that the invention is not limited thereto. On the contrary, it is intended to cover various modifications, equivalents, and similar arrangements and procedures, and the scope of the invention is intended to be limited solely by the appended claims.

What is claimed is:

1. An optical lens having an optical axis and comprising:
a first lens having negative refractive power;
a second lens having positive refractive power;
a third lens having positive refractive power;
a fourth lens having negative refractive power;
a fifth lens having positive refractive power; and
a sixth lens having refractive power, an image-side surface of the sixth lens has an infection point, a distance between the infection point and the optical axis is h13, a radius of the sixth lens is H13, and |h13/H13|≤0.55.

2. The optical lens according to claim 1, wherein the first lens has an Abbe number V1, the second lens has an Abbe number V2, and 50≤V1 and/or V2≤45.

3. The optical lens according to claim 1, wherein F12 is a total focal length of the first lens and the second lens, F34 is a total focal length of the third lens and the fourth lens, D34 is a distance between an image-side surface of the third lens and an object-side surface of the fourth lens, and 40≤|F12+F34−D34| and/or |F12+F34−D34|≤55.

4. The optical lens according to claim 1, wherein the third lens has a focal length F3, the fourth lens has a focal length F4, and 0.9≤|F3/F4|.

5. The optical lens according to claim 1, wherein the fourth lens has a central thickness T41, the fourth lens has an edge thickness T42, T42/T41=C4, and C4≤3.0.

6. The optical lens according to claim 1, wherein a central thickness of the sixth lens is T6, and T6≤0.55 mm.

7. The optical lens according to claim 1, wherein the optical lens satisfies at least one of the following conditions: the first lens is a convex-concave lens, the second lens is a double convex lens, the third lens is a double convex lens, the fourth lens is a double concave lens, the fifth lens is a double convex lens, the sixth lens is a double concave lens, the second lens is a spherical lens, at least one of the first lens, the third lens, the fourth lens, the fifth lens and the sixth lens is an aspheric lens or a free-form lens, the second lens is a glass lens, and at least one of the first lens, the third lens, the fourth lens, the fifth lens and the sixth lens is a plastic lens.

8. An optical lens having an optical axis and comprising:
a first lens having negative refractive power;
a second lens having positive refractive power;
a third lens having positive refractive power;
a fourth lens having negative refractive power;
a fifth lens having positive refractive power; and
a sixth lens having refractive power, an image-side surface of the sixth lens has an infection point, an extending distance between an intersection point of the image-side surface of the sixth lens and the optical axis and a projected position of the infection point on the optical axis is δ13, a distance between the image-side surface of the sixth lens and an imaging plane along the optical axis is BF, and |δ13/BF|≤1.0.

9. The optical lens according to claim 8, wherein the first lens has an Abbe number V1, the second lens has an Abbe number V2, and 50≤V1 and/or V2≤45.

10. The optical lens according to claim 8, wherein F12 is a total focal length of the first lens and the second lens, F34 is a total focal length of the third lens and the fourth lens, D34 is a distance between an image-side surface of the third lens and an object-side surface of the fourth lens, and 40≤|F12+F34−D34| and/or |F12+F34−D34|≤55.

11. The optical lens according to claim 8, wherein the third lens has a focal length F3, the fourth lens has a focal length F4, and 0.9≤|F3/F4|.

12. The optical lens according to claim 8, wherein the fourth lens has a central thickness T41, the fourth lens has an edge thickness T42, T42/T41=C4, and C4≤3.0.

13. The optical lens according to claim 8, wherein a distance between the infection point and the optical axis is h13, a radius of the sixth lens is H13 and a central thickness of the sixth lens is T6, and the optical lens satisfies |h13/H13|≤0.55 and/or T6≤0.55 mm.

14. The optical lens according to claim 8, wherein the optical lens satisfies at least one of the following conditions:

the first lens is a convex-concave lens, the second lens is a double convex lens, the third lens is a double convex lens, the fourth lens is a double concave lens, the fifth lens is a double convex lens, the sixth lens is a double concave lens, the second lens is a spherical lens, at least one of the first lens, the third lens, the fourth lens, the fifth lens and the sixth lens is an aspheric lens or a free-form lens, the second lens is a glass lens, and at least one of the first lens, the third lens, the fourth lens, the fifth lens and the sixth lens is a plastic lens.

15. An optical lens, in order from an object side to an image-forming side comprising:
- a first lens having negative refractive power;
- a second lens having positive refractive power, wherein the second lens has an Abbe number V2, and V2≤45;
- a third lens having positive refractive power;
- a fourth lens having negative refractive power;
- a fifth lens having positive refractive power; and
- a sixth lens having refractive power, a central thickness of the sixth lens is T6, and T6≤0.55 mm.

16. The optical lens according to claim 15, wherein the first lens has an Abbe number V1, and 50≤V1.

17. The optical lens according to claim 15, wherein F12 is a total focal length of the first lens and the second lens, F34 is a total focal length of the third lens and the fourth lens, D34 is a distance between an image-side surface of the third lens and an object-side surface of the fourth lens, and 40≤|F12+F34−D34| and/or |F12+F34−D34|≤55.

18. The optical lens according to claim 15, wherein the third lens has a focal length F3, the fourth lens has a focal length F4, and 0.9≤|F3/F4|.

19. The optical lens according to claim 15, wherein the fourth lens has a central thickness T41, the fourth lens has an edge thickness T42, T42/T41=C4, and C4≤3.0.

20. The optical lens according to claim 15, wherein the optical lens satisfies at least one of the following conditions: the first lens is a convex-concave lens, the second lens is a double convex lens, the third lens is a double convex lens, the fourth lens is a double concave lens, the fifth lens is a double convex lens, the sixth lens is a double concave lens, the second lens is a spherical lens, at least one of the first lens, the third lens, the fourth lens, the fifth lens and the sixth lens is an aspheric lens or a free-form lens, the second lens is a glass lens, and at least one of the first lens, the third lens, the fourth lens, the fifth lens and the sixth lens is a plastic lens.

\* \* \* \* \*